United States Patent [19]

Lockwood et al.

[11] 4,253,418
[45] Mar. 3, 1981

[54] ABALONE MARICULTURE

[75] Inventors: George S. Lockwood, Carmel Valley; Fred T. Shultz, Sonoma; Gerrit Bevelander, Carmel, all of Calif.

[73] Assignee: Monterey Abalone Farms, Monterey, Calif.

[21] Appl. No.: 935,872

[22] Filed: Aug. 23, 1978

[51] Int. Cl.³ .............................................. A01K 61/00
[52] U.S. Cl. ....................................... 119/2; 119/4; 47/1.4
[58] Field of Search ........................ 119/2, 3, 4; 47/1.4

[56] References Cited

U.S. PATENT DOCUMENTS

| | | | |
|---|---|---|---|
| 2,302,336 | 11/1942 | MacDonald | 119/2 |
| 2,944,513 | 7/1960 | Keely | 119/3 |
| 3,473,509 | 10/1969 | Miyamura | 119/2 |
| 3,724,423 | 4/1973 | Day et al. | 119/4 |
| 3,884,186 | 5/1975 | Hickey | 119/3 |
| 3,889,639 | 6/1975 | Day et al. | 119/2 |
| 3,985,101 | 10/1976 | Thompson | 119/2 |
| 3,986,297 | 10/1976 | Ichimura et al. | 47/1.4 |
| 4,078,521 | 3/1978 | Laubier | 119/2 |
| 4,182,270 | 1/1980 | Fourcher | 119/4 |

Primary Examiner—Hugh R. Chamblee
Attorney, Agent, or Firm—Christie, Parker & Hale

[57] ABSTRACT

A tank for use in the culturing of marine and aquatic organisms that undergo larval settlement upon submerged surfaces and metamorphose thereon to become benthic motile animals that crawl upon said surfaces and graze food found thereon, such as abalone (phylum Mollusca, class Gastropoda, family Haliotidae), other gastropod molluscs including, but not limited to conch (class Gastropoda, genera Strombus, Cassis, Charonia, and others), Chilean "loco" (*Chonocholepas, chonocholepas*), sea urchins (phylum Echinodermata, class Echinoidea, order Cidaroidea), and other marine and aquatic motile benthic organisms of economic and scientific importance. The tank is provided with means for circulation of seawater through the tank and means are provided in the tank forming solid surfaces on which the larvae of abalone or other motile benthic organisms settle, feed and rest. Light sources may be immersed in the tank to engender a high level of photosynthesis for food production and water quality control, and means are provided to introduce air into the tank to induce water circulation therein.

17 Claims, 9 Drawing Figures

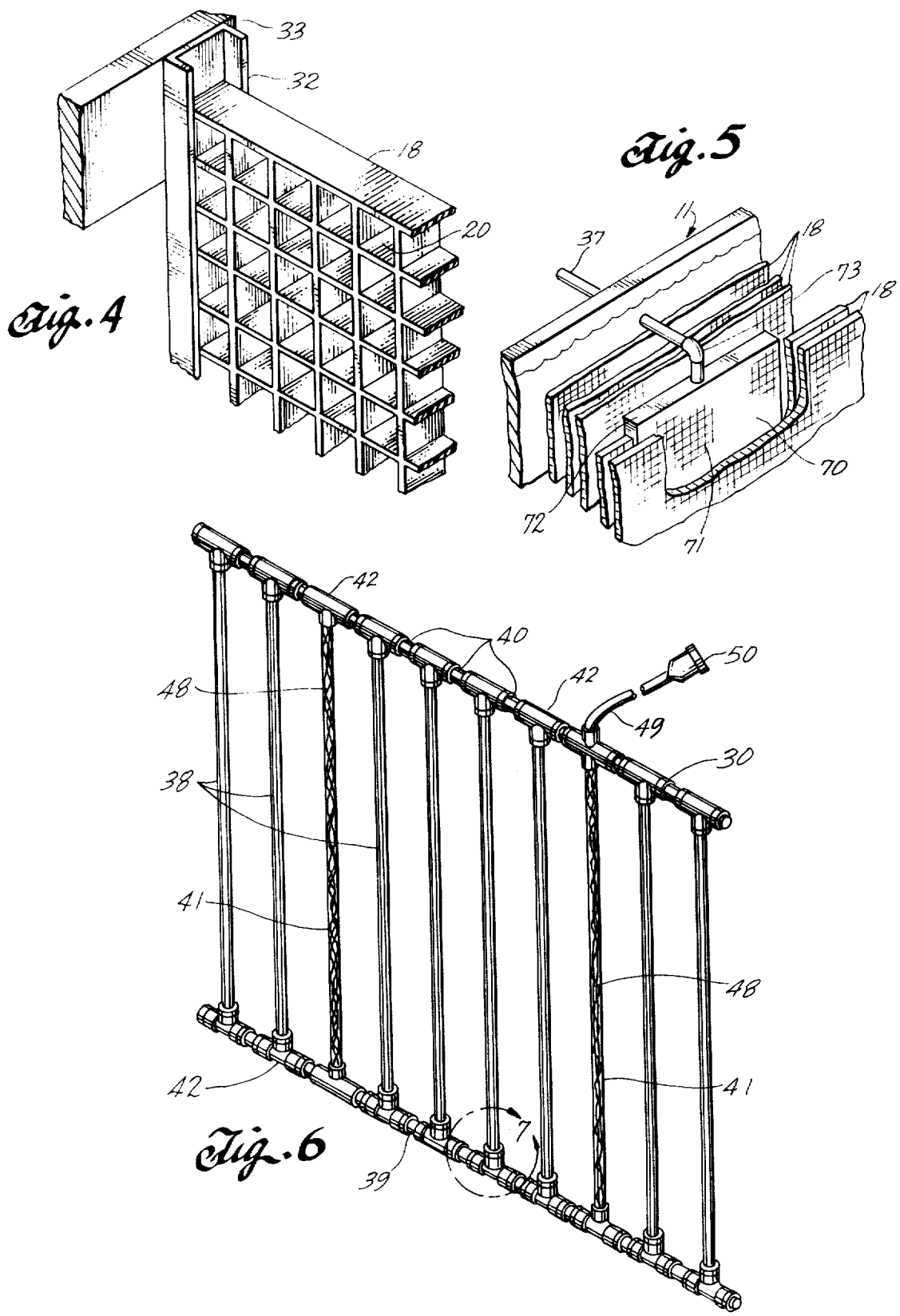

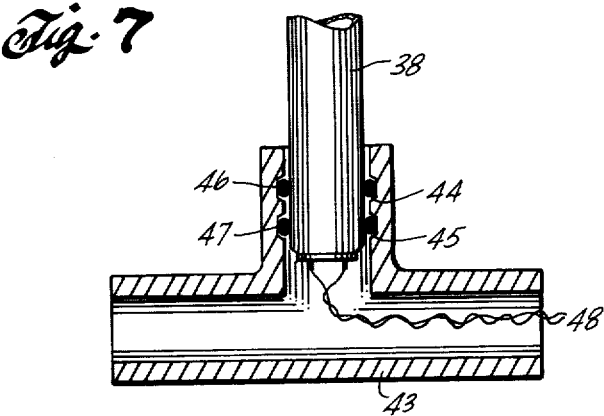
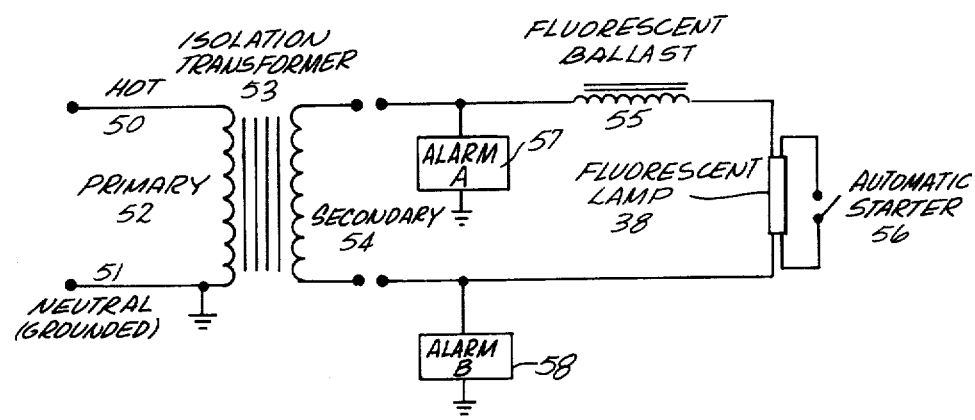
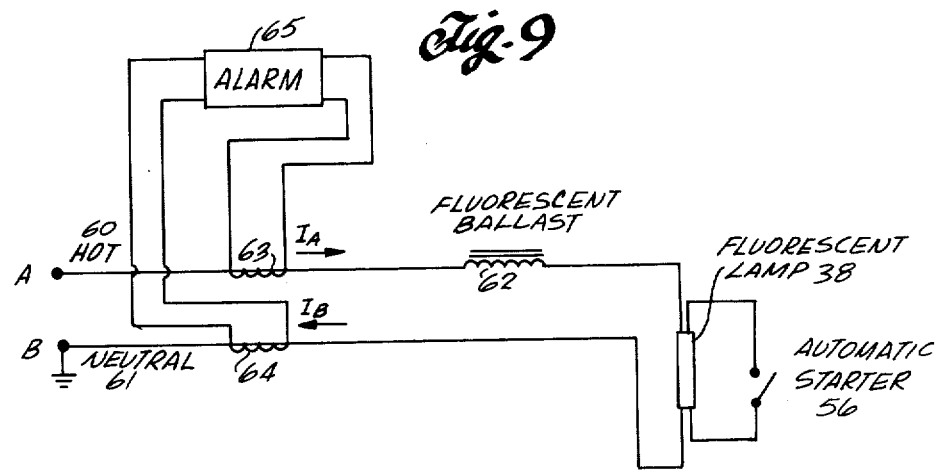

ABALONE MARICULTURE

BACKGROUND OF THE INVENTION

Because of the primary commercial importance of abalone among marine organisms above classified, the abalone is used as the basis for describing our invention.

Abalone, in the natural state, are fast being depleted by predators, ocean pollution and commercial harvesting to the point that there is no longer an adequate supply of this shellfish to satisfy world demand. The price of edible abalone meat has escalated seven-fold over the last ten years.

It is pertinent to the present invention that when swimming abalone larvae reach a certain stage of development, they begin to search for suitable substrates upon which to settle and change from a swimming larvae to a surface crawling animal. With a suitable substrate and other favorable conditions, the young gastropod undergoes metamorphosis and rapid growth. Our copending application Ser. No. 955,944, filed Oct. 30, 1978, is directed to procedures for optimizing the settlement of abalone larvae and the rapid growth of the juvenile animals.

In nature and in culture, the larvae select suitable surfaces upon which to settle by temporarily ceasing to manipulate their swimming mechanism, thereby allowing gravity to gently pull their body to the ocean floor. When a larva settles upon a surface on the sea floor, it extends a muscular foot and attempts to attach to the solid material upon which it has landed. As described in the aforementioned application Ser. No. 955,944, this settlement process may take some time before the larva finds the surface suitable to it. In nature, and therefore also in culturing operations, abalone usually find upward facing surfaces of an approximate horizontal orientation for settlement, yet when they grow in size they often prefer to rest on vertical and downward facing horizontal surfaces when they are not foraging for food. In addition, young abalone seek out corners for protection when not actively feeding. Recognizing the needs of a young abalone and the procedures necessary for the successful mariculture thereof, we have developed a specially designed tank for this purpose.

SUMMARY OF THE INVENTION

In our copending application Ser. No. 955,944, filed Oct. 30, 1978, we have also described procedures for the care and feeding of juvenile abalone in a mariculture environment. The process described in the copending application involves providing the abalone with a carefully controlled seawater environment in which extensive specially prepared submerged surface areas are provided on which the abalone may settle, feed and rest; in which the quality of the seawater environment is carefully controlled by photosynthesis and circulation of water through the tank and recirculation of seawater within the tank; and in which substantial amounts of desired food species are grown on the submerged surfaces contained within the tank.

We have developed a mariculture tank particularly suited to the culture of small abalone and other gastropods, in accordance with the processes of our copending application. The tank has been specially developed and designed for larvae settlement and for growing abalone for the first 180 days of their lives, and with suitable modifications abalone up to two years and three inches in size can be grown in this tank. The tank provides a convenient, self-cleaning unit which, in the dimensions specifically set forth below, is capable of producing at least 25,000 (and possibly even more) young abalone of one-half inch size with a minimum of labor. In addition, it is designed to provide a large amount of fully submerged surface area for photosynthetic food production. Such photosynthesis also helps maintain water quality within the tolerances required for good abalone growth and health, all as described in detail in our copending application Ser. No. 955,944.

The tank is shaped to provide good circulation of seawater therein, and a plurality of fully submerged flowthrough gridlike structures, each containing a multitude of compartments, are removably immersed in the body of water within the tank in substantially vertical orientation to provide the large horizontal and vertical surface area and a multiplicity of corners that are essential to this type of culture. All such growing surfaces are fully submerged to minimize mortality from animals crawling out of the tank. Provision is made in the tank for introducing air at carefully selected locations to periodically induce circulation of the water in the tank, thereby facilitating the removal of waste products, and artificial lighting means are removably immersed in the tank to provide a high degree of illumination necessary to insure high levels of photosynthesis within the tank. The tank and its fittings are described below in relation to the accompanying drawings.

DESCRIPTION OF THE DRAWINGS

FIG. 4 is an enlarged perspective view taken on the line 4—4 of FIG. 1 showing the means removably retaining the grid structures in the tank;

FIG. 5 is an enlarged perspective view taken on the line 5—5 of FIG. 1 showing in detail the water discharge assembly;

FIG. 6 is a perspective view of an immersible fluorescent light assembly;

FIG. 7 is an enlarged sectional elevation of a portion of the submerged light assembly taken on the line 7—7 of FIG. 6;

FIG. 8 is a circuit diagram showing one usable circuit for the submerted light system; and FIG. 9 is a diagram of an alternate circuit for the submerged light system.

DETAILED DESCRIPTION OF THE INVENTION

Figure 1:
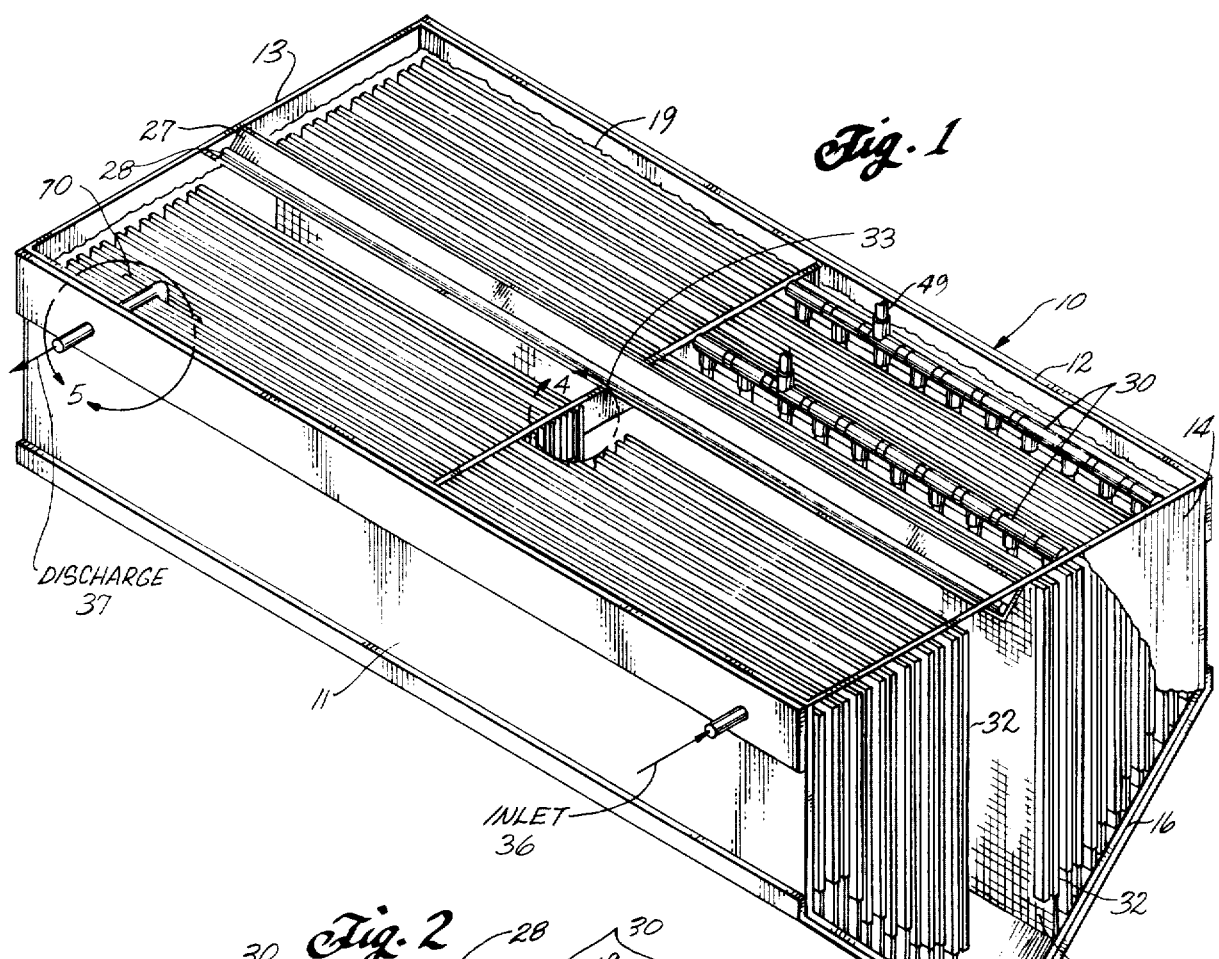
FIG. 1 is a perspective view of the growing tank with a portion of the near end removed for illistrative purposes.
Figure 2:
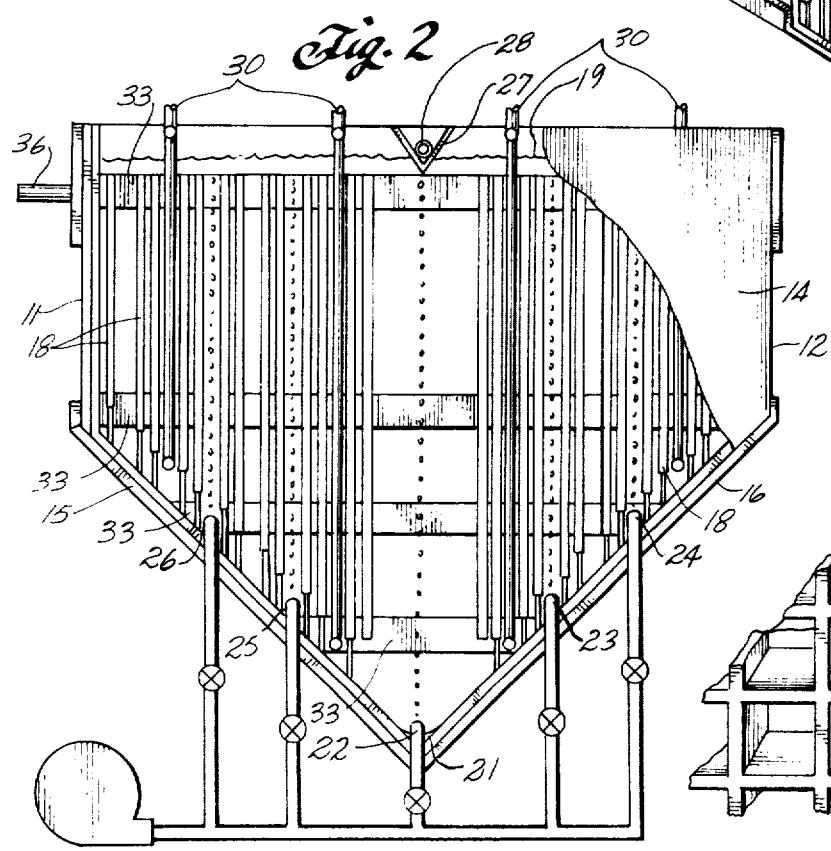
FIG. 2 is an end elevation of the tank shown in FIG. 1 with the same portion of the near end plate removed.

The apparatus shown in FIGS. 1, 2, 3, 4 and 5 of the drawing comprises a tank 10 having side walls 11 and 12, end walls 13 and 14, and bottom members 15 and 16 inclined to a lower apex 17 to form a "V" shaped tank bottom. The tank may be constructed, for example, of ¾ inch, heavy density marine coated plywood, of fiberglass, or of some other suitable material. It is conveniently about twice as long as it is wide, with a water depth at the center of the "V" bottom of approximately twice the water depth at the side edges. After construction, the internal surfaces of the tank are preferably coated with a polyester resin pigmented white to provide a smooth, non-porous, inert, and waterproof interior surface. The white coloring is preferred as a reflector of light to improve the efficiency of immersed light sources hereinafter described. The smooth non-porous surface minimizes the accumulation of waste products, as well as minimizing bacterial growth. The corners of the tank can be reinforced with fiberglass to provide structural strength and to prevent cracking of the polyester coating.

A plurality of grid sheets 18 providing a multiplicity of intersecting surfaces are suspended approximately vertically in the tank in spaced, parallel relation extending from just below the water surface 19 to just above the bottom members 15 and 16. The grid sheets are removably inserted into channel members 32 supported in parallel, spaced relation on the inside of the opposite end members 13 and 14 and in medial transverse structural stays 33. Each grid sheet, therefore, is supported at its opposite ends in a channel member 32 and may be slid in and out thereof at will. The channel members provide a slot that is approximately one-eight of an inch wider than the grid sheets to facilitate easy removal. The manner of retaining the grid sheets in the channel members is shown in greater detail in FIG. 4, which is an enlarged view taken on the line 4—4 of FIG. 1.

Figure 3:
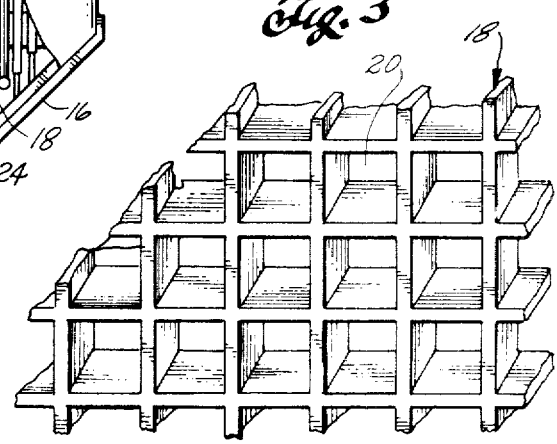
FIG. 3 is a enlarged perspective view of a portion of the grid structures suspended in the tank of FIG. 1.

Conveniently, the grid sheets 18 inserted initially in the tank are fabricated from standard manufactured fluorescent light louvres of approximately ½ inch thick molded ABS, polystyrene, or acrylic, to provide a uniform repetitive pattern of open cubicles approximately ½ inch in each dimension with four solid walls and two opposite open walls in each cubical compartment. A commercial product that satisfies these requirements, for example, is an injection molded plastic "egg crate" louvre manufactured by the American Louvre Company, Skokie, Illinois. FIG. 3 shows a section from a typical grid sheet 18 containing the open-ended cubical compartments 20. These grid sheets are placed preferably at an approximately 5° angle from vertical in the tank to prevent the collection of gas bubbles on the downward facing ceilings of the cubical compartments. Although a 5° deviation from vertical is a preferred orientation of the grid sheets, inclinations as great as 30° are acceptable, and the system is entirely operable with the grid sheets in precise vertical orientation.

The grid sheets are easily removed since they are loosely fit into the channel member 32, a molded plastic member providing a slot or guide to contain the grid sheet that is affixed to the tank, as shown in detail in FIG. 4. This arrangement allows convenient means for removal.

The removability afforded by this design provides several significant benefits. First, these compartment structures can be easily removed for cleaning when preparing the tank for the settling conditioning process described in application Ser. No. 955,944. Secondly, such easy removal allows convenient inspections of the growing surfaces and the animals thereon. Thirdly, and of particular importance, the density of the abalone population may be conveniently reduced by transferring some of the grid sheets from one tank to another. This flexible "thinning" arrangement is valuable since as the young abalone grow they can over-consume the amount of food available in the tank. By transferring a portion of the abalone population to another tank (or tanks) the food producing and photosynthetic capacity of the tank is not overloaded and optimum growing conditions can be maintained. We prefer to transfer one-half to two-thirds of the grid sheets out of the initial settling tanks after approximately 60 days into similar tanks where the grid sheets are coated with the desired mix of phytoplankton. The grid sheets removed from the first tank containing the growing abalone are replaced with sheets from the second and third tanks where they have previously grown a heavy coating of desired phytoplankton. Such grid sheet transfers thereby reduce the abalone density and add substantial quantities of growing and photosynthesizing phytoplankton. Such flexibility is not provided in other abalone culturing apparatus, such as open tanks, as used in operations in the United States where the abalone must be individually physically removed from the tank walls and bottoms for transfer and density reduction. Such individual removal is time-consuming and often damages the animal. The Japanese have a system which involves the disposition of stacked, spaced, corrugated sheets horizontally disposed in the bottom of a settling tank, relying on water flow to carry the larvae between the stacked sheets so that larva will in fact settle on the several horizontal surfaces. Subsequently, the multiple sheet modules may be vertically oriented in the tank and to which the growing abalone will continue to cling. However, this Japanese system does not provide the compatible habitat nor the flexibility of operation, nor the high animal densities provided by the structure of this invention. The state-of-the-art in Japan and the United States is represented by the following publications:

1. "The Abalone Science and its Propagation in Japan", Takashi Ino, (original title in Japanese, "Awabi To Sono Zoyoshoku"), Vol. 11 in Series on the Propagation of the Marine Products, 1966, published by Nippon Suisan Shigen Hogo Kyokai.

2. "Abalone", Masaaki Inoue, Vol. I in Marine Product Culture Data Book, 1976, published by Suisan Shuppan (Marine Printing).

3. "Laboratory Observations on the Early Growth of the Abalone, Haliotis Sorenseni, and the Effect of Temperature on Larval Development and Settling Success", David L. Leighton, published in Fishery Bulletin, Vol. 70, No. 2, 1972.

As the abalone grow to one-half inch size they continue to crawl upon the grid sheet surfaces feeding on phytoplankton growing on the surfaces or upon artificial feed that may be introduced to the tank that settles upon the horizontal surfaces of the grid sheets. The young animals also seek refuge at the corners of the multitudinous compartments contained in the grid sheets. However, as the animals grow larger, a compartment with larger dimensions must be provided. The same tank is used except the grid sheets with ½ inch cubes are replaced by fabricated sheets with larger compartment dimensions. For instance, the next sized compartment from the ½ inch size is a rectangular parallelepiped 1 inch wide by 2 inches long by ¾ inch high. This compartment provides all the benefits of the smaller cubicles but allows larger animals to rest conveniently in them.

The bottom upward facing surface of each compartment provides a horizontal surface area for larvae settlement and for the young animals to forage for food which settles or grows thereon. The vertical and ceiling surfaces of each cubicle provide good areas for phytoplankton growth as well as for abalone to rest, and innumerable corners for which juvenile abalone seek protection.

The placement of the grid sheets in a substantially vertical mode with an approximate 1¼ cm. spacing between them allows water to flow readily through the compartments from one side of the grid sheet to the other to insure good water exchange, and also permits good light penetration, the importance of which will be described.

The top of each grid sheet is approximately 5 to 10 centimeters below the water surface in order to provide good water circulation over the top of and around the compartment structures. In addition, a tank of this design where the growing surfaces are totally submerged and do not pass through the water-air interface minimizes the opportunity for the young abalone to crawl through the interface while foraging for food, thereby desiccating and perishing, which is a frequent occurrence in tanks and aquaria where the tank walls are used as the growing surfaces. This is one of the principal causes or mortality of young abalone in prior art systems. We have discovered that a tank design that provides a high ratio between total submerged area of growing surfaces and the lineal measurement of the water-air interface periphery in the tank results in substantially lower crawl-out mortalities than a tank with a low ratio. In the tank used as an example hereinafter, this ratio is approximately 2200 $Cm^2$/Cm. A standard aquaria tank without added submerged growing surfaces is an example of a tank with a low ratio in which crawl-out mortality is a major problem. Typically, such a ratio of submerged surface area to the periphery of the water surface is on the order of 20 or 30. In addition, important labor cost savings result when using our system of submerged growing surfaces since animals are not continuously crawling out which have to be manually returned to the growing tank to prevent their demise.

It is important to achieve vigorous water circulation in the tank so as to minimize any accumulation of dissolved wastes, fecal matter and other debris. Such accumulations provide habitats for various species of marine worms and other predators that are particularly destructive to young abalone. In addition, pockets of detritus provide substrates for the growth of pathogenic bacteria that, of themselves, are harmful or that produce ammonia, carbon dioxide, hydrogen sulfide and other toxic compounds. To this end, a curvilinear trough 21 is disposed along the apex 17 of the tank bottom, and a series of air bubbler tubes 22, 23, 24, 25 and 26 provide means for vigorously bubbling air through the body of water in the tank. A satisfactory air tube or hose for this purpose is approximately 1 cm. in internal diameter with air holes spaced approximately one inch apart, and is a commercially available product sold by Hinde Engineering of Highland Park, Illinois, under the trademark "Air Aqua". Means are provided for supplying air under pressure to the bubbling tubes. Typically, we use for this purpose a ¾ h.p. carbon vane, low pressure air pump manufactured, for example, by Gast Manufacturing Company. A typical program for agitation of the water in the tank is accomplished by causing air flow through tube 22 during two minutes out of every 16 minutes to provide a rolling circulation of the water in the tank. Air is also periodically introduced through the several tubes 23, 24, 25 and 26 for two minutes in every hour to provide a variety of flow patterns within the tank. The water is quiescent between periods of air agitation. The air circulation program, as described, is adequate to suspend most solid materials, including fecal wastes, and to disperse dissolved wastes adjacent each abalone, yet is not sufficiently great to disturb the young animals. The suspension of wastes in this manner, coupled with water circulation through the tank as hereinafter described, not only provides a continuously clean environment but also eliminates labor costs that would otherwise be necessary for manual cleaning. In nature, surges or wave-induced currents of the same magnitude are experienced in the abalone's habitat. The periodically induced circulation has the further important function of redistributing food particles, either phytoplankton or artificial feeds, to the feeding animals.

The periods of water circulation brought about by air introduction also provide dissolved oxygen levels close to saturation, as well as control levels of other dissolved gases, such as nitrogen, by stripping excess amounts of these gases that may be present in the water. Without these periods of rapid agitation, supersaturation of both oxygen and nitrogen could occur that would be lethal to the young abalone.

To further control and direct the water circulation in the tank so as to improve efficiency, and to help eliminate hydrodynamic dead spots that accumulate detritus, a "V" shaped deflector baffle 27 may be mounted between the end plates 13 and 14 at the longitudinal centerline of the tank and arranged to penetrate the water-air interface to baffle the water flow induced by air bubbling. A tie rod 28 may be housed within the baffle 27 forming a structural tie between the end plates 13 and 14.

Means are provided for the introduction and discharge of a flow of seawater through the tank. Seawater of the desired quality can be added by a number of means, including free-falling from an overhead valve or pipe, or as shown, from an inlet pipe 36 through the side 11 of tank 10. We prefer to remove the seawater through a discharge pipe 37 passing through the tank wall 11 at an elevation sufficient to control the height of the surface water 19 in the tank at a desired level, terminating in the tank in a filter assembly 70. By introducing new seawater at one end of the tank and discharging at the other end, optimum water quality is maintained by the removal of suspended solids and dissolved wastes. The rate of flow of new seawater into the tank can be regulated by valves (not shown) for optimum levels of waste removal and water quality. We prefer to maintain this flow at a rate that provides a complete change of water in the tank about every eight hours, although it is possible to operate on much longer and even sporadic water replacement cycles.

During periods of larvae settling, we attach an approximate 100 micron filter assembly 70 to the inner end of the discharge line 37 to prevent the free-swimming larvae from being washed out of the tank. This filter assembly 70 is shown in FIG. 5 as including a filter screen 71 supported on a core 72 and connected at 73 to the discharge tube. The filter assembly is disposed between spaced grid sheets 18. Construction of the filter, as shown, provides approximately 4,000 square centimeters of screen area. Such a large screen area results in a slow water flow rate across the screen, thereby preventing the entrapment of swimming larvae.

A number of light assemblies 30 for providing high intensity artificial light to engender photosynthesis are removably immersed in the tank. Each of the light assemblies, as shown in the perspective view of FIG. 6, comprises a plurality of spaced, parallel, fluorescent lamp tubes 38 extending vertically from top to bottom of the tank and joined together as one removable assembly by lower horizontal connecting tube 39 and upper horizontal connecting tube 40. Tubes 41 serve as conduits to carry electrical wires 48 to the lower connecting tube 39. The connecting tubes 39 and 40 include a number of waterproof sockets 42, into which the opposite ends of the fluorescent tubes 38 are inserted in a watertight arrangement. One of the sockets 42 is shown in enlarged sectional elevation in FIG. 7 and comprises a standard plumbing plastic "Tee" member 43, in the "Tee" stem of which are machined two inner circumferential grooves 44, 45 in which are placed typical rubber "O" rings 46, 47, respectively. The end of the fluorescent lamp tube 38 is inserted and held in watertight relationship by the "O" rings 46, 47. Although we prefer to use two "O" ring seals in each socket, only one such seal is necessary. Furthermore, types of seals other than "O" rings can be used as long as a watertight integrity is maintained. For example, plumbing compression fittings can be used as well as precision molded rubber boots. The connecting tubes 39 and 40 also provide a dry passageway for the wires 48 which are brought out of the light assembly in a waterproof flexible cable 49 connected at a dry location through connector 50 to the ballasts, alarm and control circuitry, as shown in FIGS. 8 and 9. In FIG. 1, the light assemblies 30 are shown only in one quadrant of the tank 10, but it should be understood that we immerse one or more similar light assemblies in each of the other three quadrants of the tank. It will be apparent that the light assemblies mounted adjacent the side walls of the tank have shorter light tubes than the assemblies mounted closer to the deeper section of the tank.

FIG. 8 shows a typical electric circuit for the light assemblies providing suitable safety means that are desirable since the light assemblies are immersed in salt water. While it is possible to operate immersed light systems with only conventional fuse or circuit breaker protection against overloads, or even without such conventional protection, the combination of high electrical potentials and highly conductive salt water at ground potential makes improved human safety considerations and precautions important. For this reason we prefer to isolate our lighting system from the standard grounded electrical system that usually provides commercial electrical service. Electrical energy from conventional 120 volt service lines where one leg is energized or "hot" and the other leg is grounded or "neutral" is applied, as shown, through leads 50, 51 to the primary coil of an isolation transformer 53. This isolation transformer has an ungrounded secondary, thereby avoiding dangerous electric potentials between any point in the lamp circuitry and the grounded seawater in the tank. The only electrical potential that exists in such an isolated circuit is between the two legs of the transformer secondary 54 and not between either of the legs and ground. The ungrounded secondary 54 of the transformer 53 is connected in the usual manner through a fluorescent ballast to the fluorescent lamp tube 38. The automatic starter circuit 56 is connected in the normal fashion with the tube 38. Other ballasts and starter circuits (or starterless circuits) can be used, and the simplified ballast and starter circuits shown are for illustrative purposes only.

In addition to the safety benefits provided by an ungrounded isolated system, further safety benefits are provided through ground fault alarms 57 and 58, which deenergize the circuit and/or sound an alarm if certain unsafe conditions occur, such as if one leg of the lamp circuit accidentally becomes grounded, thereby providing a dangerous electric potential between the other leg of the circuit and ground.

Alarms 57 and 58 continuously monitor whether or not either leg of the secondary circuit has become accidentally grounded, as might occur in the salt water bath if a lamp breaks or a watertight seal leaks. If such a ground fault occurs, the alarm is activated either to send a warning signal or to disconnect the circuitry until the ground fault is corrected, or preferably to accomplish both of these objectives.

A single isolation transformer and alarm circuit can be used as the power supply on safety alarms for a number of tanks. The alarm can detect a ground fault in one of three ways. One method is to continuously measure the impedance between each leg of the secondary circuit 54 and ground using standard impedance measuring techniques, which should be at least 10,000 ohms under normal circumstances. A lower impedance value will indicate a fault condition that could be dangerous. A second method is to measure voltage between each leg of the secondary circuit 54 to ground which, under normal circumstances, should be less than 20 volts for either leg of the circuit, which is a safe potential. This is the voltage which normally occurs due to capacitance and inductive couplings, and resistive leakage, between the seawater bath and the lamps and their associated circuitry. With an accidental ground fault, the potential between the grounded leg and ground decreases to zero, and the potential between the ungrounded leg and ground is then 80 volts or more. This change in potential between either leg and ground is used to actuate the alarm. A modification of this voltage-to-ground system is to continuously monitor the difference between the voltage-to-ground levels in both legs. A sudden and large difference between the two levels will indicate a ground fault.

Still a third method of ground fault detection is to measure the electrical current-to-ground at each alarm point. The leakage current level under normal circumstances is constant at approximately one milliampere for each 30 watt lamp. The alarm can be set to actuate above the normal threshold current value that occurs in case of a ground fault.

In cases where an isolated circuit is not used, ground fault protection can be provided in a different manner. We prefer, however, to use the ungrounded isolation system described since it provides superior safety benefits over an unisolated system, even an unisolated system with safety alarms and disconnects that will next be described.

A somewhat simplified circuit for an underwater lighting system directly connected to a grounded electrical service is shown in FIG. 9. In this Figure, line current is supplied through terminals A, B, one leg 60 of the circuit being "hot" and the other leg 61 being grounded or "neutral", through fluorescent ballast 62 and to the fluorescent lamp 38. In this circuit, coils 63, 64 monitor the current flow in both legs of the circuit. Under perfect no-leakage conditions, the current in legs 60 and 61 are equal. However, as heretofore described, there is always some leakage current from the hot leg to ground through the fluorescent lamps. This leakage results in a lesser current level in the neutral leg than in the hot leg. Therefore, $I_A = I_B + I_{leakage}$. This leakage current is usually very small, on the order of one milliamperes per fluorescent lamp. However, if a ground fault occurs in either leg, the difference between $I_A$ and $I_B$ becomes larger. As in the circuit of FIG. 8, the alarm 65 is set to detect a current difference in excess of the normal, and will actuate the alarm 65, which may emit a warming signal or de-energize the circuit, or both.

Photosynthesis plays an important part in the provision of an adequate food supply in the mariculture environment as well as in the control of ammonia, carbon dioxide, and possibly other chemical species and compounds dissolved in the seawater. Photosynthesis may also produce other important chemical compounds or effects that condition the water for good abalone growth. The various species of diatoms, algae, and phytoplankton used as abalone food will use ammonia as a nitrogen nutrient and will use carbon dioxide as a carbon nutrient, as well as other required nutrients, if adequate light energy is available. In addition to removing undesirable compounds from the water environment and possibly producing desirable compounds, the photosynthesis process also causes the phytoplankton food species to multiply and thereby produce, in-situ, food for the growing abalone. We have found that high levels of in-situ food production is essential for the cultivation of post larval abalone in high density, and, without which food production, slow growth and high mortality from starvation occur.

We have found that the photosynthesis necessary to accomplish these objectives must be induced by dispersion of superambient light relatively uniformly throughout the tank and on the growing surfaces. The high levels of light energy desirable for abalone mariculture are preferably accomplished by immersing light sources 30 in the tank. Without such immersion, valuable light energy is reflected from the water surfaces. Furthermore, such immersion places the light source closer to and directed on the phytoplankton growing surfaces, thereby minimizing light energy losses due to absorption by the seawater and dispersion. The absorption of light energy per unit of distance in seawater is many times greater than air.

It is important that the light sources be positioned to radiate in a direction normal to the plane of the grid sheets so that light can penetrate through the compartments, thereby minimizing shadow effects and providing light energy to those parallel grid sheets not immediately adjacent the lighting source. Good light penetration so as to provide light intensities between 10 and 500 foot candles, and preferably at least about 200 foot candles, upon most grid sheet surfaces is provided by the positioning of the immersed light sources and the grid sheets in this manner.

A further benefit provided by our immersible light source is its ability to be removed for periodic cleaning. Phytoplankton will grow upon the lamp tubes, which must be removed from time to time for the desired intensity to be maintained. In our system, this is accomplished by temporarily removing and cleaning the entire light assembly. Such removability for cleaning is important for optimum efficiency of immersed sources.

An acceptable but less satisfactory manner of providing light penetration through the housing compartments is to fabricate the growing tank with clear plastic or glass side and bottom walls and mount banks of lights adjacent thereto on the exterior of the tank. Fixed exterior light sources cannot, without undue power consumption, compare with the immersed sources, as shown, in light efficiency and effectiveness.

We have found that a 2,000 liter tank with 400,000 square centimeters of upward facing horizontal surface area, into which are to be introduced approximately 1,000,000 larvae, requires approximately 1,500 watts of electrical energy applied to a plurality of immersed light sources for good photosynthesis during the first 60 days. We have found that it is advisable, but not necessary, to energize these lights for about 18 continuous hours out of every 24, with a six-hour dark period being preferred for good plant growth.

We have further found that the species of diatoms and algae of particular importance in this process particularly thrive on a light spectra with at least 15%, and preferable at least 25%, in the blue range of approximately 430 to 490 nanometers. The fluorescent lamp marketed under the specification "Daylight" by U.S. manufacturers is the most effective commercially available lamp. Approximately 28% of the light energy emission from this lamp is in the blue wavelength band between 430 and 490 nanometers. This lamp also apparently provides other spectral emissions important for photosynthesis. This "Daylight" lamp, for a given amount of electrical energy, produces higher rates of phytoplankton cell division, the fastest consumption of ammonia and carbon dioxide, and the largest production of protein per unit time of the many lamps that have been tested. Other commercial lamps of specifications of "Cool White", "Design White", "5000K, CRI", and "7500K, CRI" also emit large amounts of their energy in the desired wavelength band, but are not as productive as "Daylight".

A SPECIFIC EMBODIMENT OF THE INVENTION

Although the growing tank of the invention is not limited to a specific size or configuration, the detailed specifications of a tank which we have successfully used in the abalone mariculture process are as follows:

| Internal Tank Size | |
|---|---|
| Length | 240 centimeters |
| Width | 118 centimeters |
| Tank depth at center | 100 centimeters |
| Tank depth at side walls | 55 centimeters |
| Water volume | 2,000 liters |
| Water depth at center | 107 centimeters |
| Bottom slope | Approximately 45° |

| Grid Sheets | |
|---|---|
| Material | ABS or polystyrene "egg crate" light louvres |
| Number | 60 |
| Compartments | 250,000 |
| Dimensions (compartment) | $\frac{1}{2}" \times \frac{1}{2}" \times \frac{1}{2}"$ (cubes open on two sides) |
| Submerged surface area | 1,600,000 cm$^2$ |
| Corners | 1,000,000 |

| Light Assemblies | |
|---|---|
| Number per tank | 8 |
| Number of fluorescent lamps | 64 |
| Type of lamps | "Daylight" |
| Length of lamp tubes | 30 inches (for assemblies at center of tank) and 18 inches (for assemblies at sides of tank) |

-continued

| Light Assemblies | |
|---|---|
| Light energy | 30 or 15 watts per lamp |
| Program | 18 hours energized out of every 24 hours |

| Air Tubes | |
|---|---|
| Apex tube | 1 (22) |
| Auxiliary tubes | 4 (23, 24, 25, 26) |
| Air flow | 10–15 cfm at 10 psi |

| Water Circulation | |
|---|---|
| Rate | 4 liters per minute |
| Program | Continuous |

What is claimed is:

1. Apparatus for culturing motile benthic marine and aquatic organisms comprising:
   (a) a tank for retaining a volume of water,
   (b) means for circulating water through the tank,
   (c) at least one grid structure removably mounted in the tank, the grid structure forming a plurality of open sided compartments, on the surfaces of which the animals can settle, metamorphose and feed,
   (d) means for circulating water within the tank to cause it to flow through the compartments, and
   (e) at least one light source immersed in the tank adjacent the grid structure to project superambient light through the open sides of the compartments and onto the surfaces thereof to promote photosynthesis and development of micro-biological communities on such surfaces.

2. Apparatus according to claim 1 in which the means for circulating water through the tank comprises an inlet port to receive water from an external source and an exhaust port and filter means comprising a 100 micron mesh screen at the exhaust port to prevent the loss of larvae therethrough.

3. Apparatus in accordance with claim 1 in which the tank has side and end walls and a "V" shaped bottom formed by bottom sections sloping downwardly from the side walls of the tank to meet at a longitudinal line extending from end to end of the tank.

4. Apparatus according to claim 3 in which the separate means for circulating water within the tank comprises an air injection means extending along the apex of the V-shaped tank bottom, and means for introducing air into the air injector means.

5. Apparatus in accordance with claim 3 in which the separate means for circulating water in the tank comprises a first air injector means extending lengthwise of the tank adjacent the lower extremity of the "V" shaped bottom and additional air injector means extending along the bottom of the tank between the lower apex and the side members of the tank, and means for introducing air selectively and controllably to the first air injector means and the additional air injector means.

6. Apparatus for culturing motile benthic marine and aquatic organisms comprising:
   (a) a tank for retaining a volume of water,
   (b) means for circulating water through the tank,
   (c) a plurality of grid structures removably mounted in the tank in spaced relation and totally immersed therein, each grid structure forming a plurality of compartments each of which is defined by four flat surfaces forming a rectangular cubicle open at opposite sides,
   (d) means for circulating water within the tank to cause it to flow through the compartments, and
   (e) a plurality of light sources removably immersed in the tank between the grid structures to project superambient light through the open sides of the compartments and onto the surfaces thereof to promote photosynthesis and development of micro-biological communities on such surfaces.

7. Apparatus according to claim 6 in which the grid structures are mounted in the tank in spaced parallel relation at an inclination from vertical to not more than 30°.

8. Apparatus according to claim 6 in which the grid structures are mounted in the tank in spaced parallel relation at in inclination from vertical of about 5°.

9. Apparatus according to claim 6 in which the grid structures extend from adjacent the bottom of the tank upwardly toward but not traversing the water surface.

10. Apparatus in accordance with claim 6 in which each of the grid structures consists of intersecting plastic strips forming a plurality of contiguous rectangular compartments having bottom, side and top walls and being open through the structure.

11. Apparatus in accordance with claim 6 in which each of the plurality of light sources comprises a frame supporting a plurality of fluorescent lamp tubes within the periphery of the frame and forming watertight conduit means for carrying electrical conductors from the plurality of fluorescent tubes to the exterior of the tank for connection to a power supply circuit.

12. Apparatus in accordance with claim 11 in which electric power is supplied to the immersed light sources from an ungrounded power supply whereby no dangerous electrical potential exists between the seawater in the tank and any electrical conduction in the lighting circuit.

13. Apparatus in accordance with claim 11 in which at least 15% of the light energy emitted from the light sources is within the wavelength range of 430 to 490 nanometers.

14. Apparatus according to claim 11 wherein means are included in the lighting circuit to electrically disconnect the same from the power supply in the event that an energized portion of the circuit comes into electrical contact with the water in the tank.

15. Apparatus according to claim 11 in which means are included in the lighting circuit to produce an alarm signal in the event that an energized portion of the circuit comes into electrical contact with the water in the tank.

16. Apparatus according to claim 11 in which the light sources are sized and mounted in the tank to produce average illumination on the surfaces of the grid structures in the range of from about 10 to about 500 foot candles.

17. Apparatus according to claim 16 in which the light sources are sized and mounted in the tank to produce average illumination on the surface of the grid structures of at least about 200 foot candles.

* * * * *